United States Patent Office 3,526,485
Patented Sept. 1, 1970

3,526,485
METAL FILLED BODIES OF SINTERED REFRACTORY OXIDES
Walther Dawihl, Illingen, and Emil A. Klingler and Erhard Dorre, Plochingen, Germany, assignors to Feldmuhle Aktiengesellschaft, Dusseldorf, Germany
No Drawing. Filed Mar. 20, 1969, Ser. No. 809,044
Claims priority, application Germany, Mar. 23, 1968, 1,758,042
Int. Cl. C22c *15/00*
U.S. Cl. 29—182.5     4 Claims

ABSTRACT OF THE DISCLOSURE

Shaped bodies mainly consisting of a sintered polycrystalline matrix of alumina, zirconia, and/or beryllia have improved resistance to thermal shock and are practically free from pores or voids which would reduce their mechanical strength when alloys of titanium or zirconium with metals of Group 6b of the Periodic Table of Elements are uniformly distributed in the matrix.

---

This invention relates to shaped bodies mainly consisting of polycrystalline, sintered, refractory oxides of aluminum, zirconium, or beryllium, and particularly to the improvement of the mechanical and thermal properties of such oxide bodies.

Zirconium oxide, beryllium oxide, and particularly aluminum oxide in the form of polycrystalline, sintered bodies have found many applications where a combination of high mechanical strength with good resistance to sudden temperature changes is called for. Such bodies are being employed as tool bits in cutting tools, in wire drawing dies, in yarn guides for the textile industry, and also in electronic hardware and in vapor discharge lamps.

In order further to improve the resistance of such sintered bodies to rapid temperature changes, it has been proposed heretofore to admix to the ceramic material metals such as iron or the high-melting elements of Group 6b of the Periodic Table, that is, chromium, molybdenum, or tungsten. While the admixtures improve the thermal properties of the oxide bodies, lowered mechanical strength had to be accepted because the metals present prevent the elimination of pores or voids during sintering. Very little improvement was achieved by further admixtures of metal oxides, particularly those of chromium, titanium, niobium, and tantalum.

It has now been found that the desirable thermal properties achieved by distributing metals of Group 6b in the ceramic matrix can be obtained without loss of mechanical strength when the high-melting metals are present in the shaped body as alloys in which titanium and/or zirconium is the predominant or major component, the alloy being present in an amount of at least 5 percent in the sintered body which contains at least 65 percent of the ceramic oxide component.

Percentage figures throughout this specification and the appended claims will be understood to be based on weight, not on volume.

The precise function of the titanium and zirconium in the shaped bodies of this invention has not yet been determined with certainty, but it appears that the major metallic component acts somehow as a binder or bridge between the high-melting oxides and the high-melting metals of Group 6b to permit interpenetration, and thus elimination of voids, during sintering at temperatures which may be well below the melting points of the minor alloying component.

Shaped bodies which combine thermal and mechanical properties in the most favorable manner are obtained if the titanium or zirconium alloy content is between 5 and 30 percent of the total weight of the shaped body, and the best results have been achieved so far with alloys containing 10 to 90 percent titanium.

The shaped bodies of the invention may be prepared by intimately mixing the finely ground ceramic material with titanium or zirconium metal powder and a powder of the metal from Group 6b, compacting the mixture in the presence of a temporary binder, and then firing the compact at a temperature above 1500° C., preferably above 1800° C., and not normally much above 2000° C. for alumina, and at higher temperature for zirconia and beryllia, as is conventional in itself. The alloy is formed at the sintering temperature. Better control over the sintering conditions may be had by first forming an alloy of titanium or zirconium with chromium, molybdenum, or tungsten, and admixing the comminuted alloy to the ceramic powder prior to compacing and sintering.

Titanium and zirconium metal may be replaced in the first-mentioned procedure by compounds which yield the metals under the sintering conditions, more specifically the hydrides.

The specific composition of the shaped bodies of the invention may be varied freely within the limits indicated above to achieve best results in specific applications and to suit the equipment available for preparing and sintering the compacts.

Minor admixtures of nickel to the alloy ingredients, not more than about 5 percent of the alloy, have been found to be beneficial and even smaller amounts of vanadium and niobium further enhance mechanical strength and resistance to thermal shock.

The compositions of the invention have been used with superior results in bearing sleeves and in cutting tool bits in which their very high wear resistance at varying temperatures determines their performance.

Representative shaped bodies were prepared from the ingredients listed in the following table by sintering green compacts of the mixtures in a reducing atmosphere or in a high vacuum under conditions otherwise not differing from the usual procedures of this art.

TABLE.—PERCENT

| Composition No. | I | II | III | IV |
|---|---|---|---|---|
| Aluminum oxide | 65 | 80 | | 65 |
| Zirconium oxide | | | 55 | |
| Beryllium oxide | | | 20 | |
| Titanium | | 30 | 15 | 20 |
| Titanium hydride | | | 5 | |
| Zirconium | | | 15 | |
| Chromium | | | 5 | 2 |
| Molybdenum | | | | 10 |
| Tungsten | 5 | | 5 | |
| Nickel | | | | 2 |

What is claimed is:
1. A shaped body essentially consisting of:
(a) a matrix of polycrystalline, sintered oxide of at least one metal of the group consisting of aluminum, zirconium, and beryllium in an amount of at least 65 percent of said body; and

(b) an alloy of titanium or zirconium as the major component with at least one metal of Group 6b in the Periodic Table of the Elements as a minor component, said alloy being substantially uniformly distributed in said matrix in an amount of at least 5 percent of said body.

2. A body as set forth in claim 1, wherein the amount of said alloy is between 5 and 30 percent of the weight of said body.

3. A body as set forth in claim 2, wherein said alloy contains 10 to 90 percent titanium.

4. A body as set forth in claim 2, wherein said alloy contains up to five percent nickel.

References Cited

UNITED STATES PATENTS

| | | | |
|---|---|---|---|
| 3,166,833 | 1/1965 | Globus | 29—182.5 |
| 3,350,179 | 10/1967 | Stenerson | 29—182.5 |
| 3,379,523 | 4/1968 | Das Chaklader | 75—206 |
| 3,409,419 | 11/1968 | Yates | 29—182.8 X |

CARL D. QUARFORTH, Primary Examiner

A. J. STEINER, Assistant Examiner

U.S. Cl. X.R.

75—206